Figure 1:
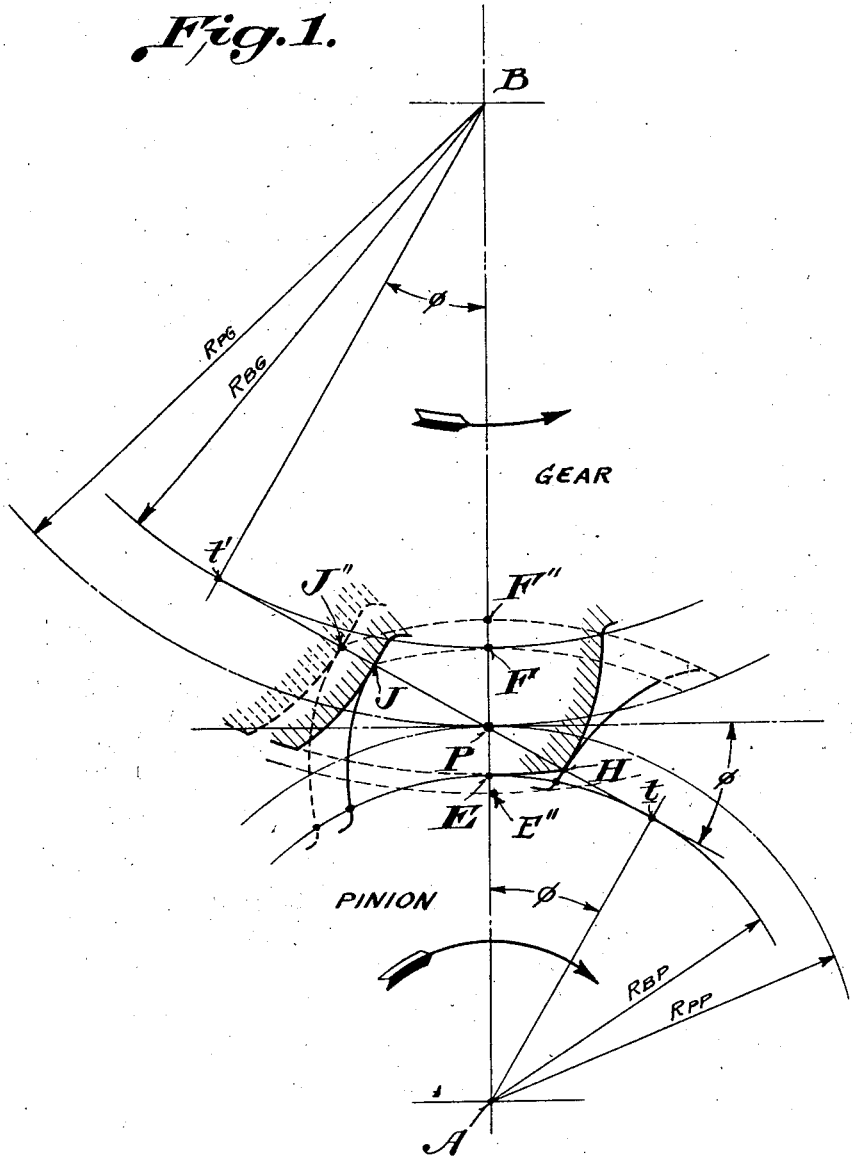

Nov. 1, 1927.

A. E. NORTON

GEAR

Filed Jan. 12, 1925

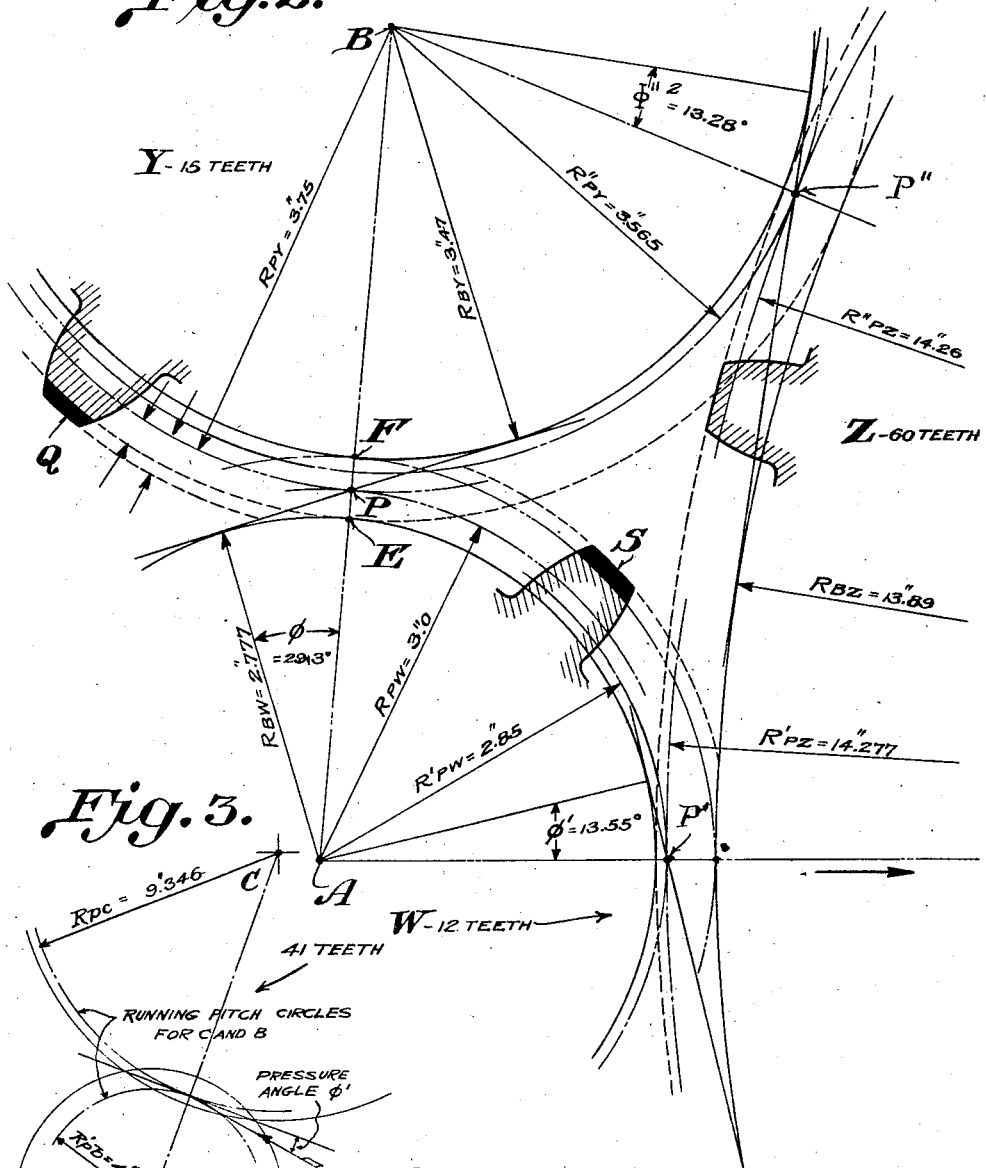

Patented Nov. 1, 1927.

1,647,191

UNITED STATES PATENT OFFICE.

ARTHUR E. NORTON, OF BELMONT, MASSACHUSETTS.

GEAR.

Application filed January 12, 1925. Serial No. 1,821.

This invention relates to a combination of involute gear wheels into a drive and has for its object to secure in a systematic way such preferable pressure angles and addendum distances that the teeth will be stronger, less space shall be required, "interference" shall not occur between the tip of any tooth and the inner surface of its mate, sliding friction and heating shall be minimized, and the overall efficiency of the drive shall be increased.

The correlative effect of changes in pressure angle and addendums upon such properties as strength of teeth, interference, and sliding friction has received some study and the technical term "mean specific sliding" or "ratio of sliding to rolling" has been adopted as an index number to indicate the degree to which sliding action and therefore friction loss is present in any part of the working profile of the tooth curve.

It is known that in general the mean specific sliding is worse and interference more likely to occur on the inner surface of the smaller wheel of a meshing pair (called the "pinion"). To improve this condition it is known to be desirable to have on the pinion a long addendum and a short dedendum, and vice versa on the mating gear.

It is also known that the standard pressure angles of 14½ or 20 degrees are compromises and that other pressure angles would improve the above mentioned working properties in particular cases.

While these ideas have been discussed in the literature of the art, they have generally been employed at random for the correction of difficulties on gear teeth conforming to existing standards, while my invention is, so far as I know, the first drive combination devised in the particular and systematic way herein described, so that preferable pressure angles and addendums are secured, varying in such a way as to allow an approach to ideal working properties without later correction.

I will now explain in detail the method of my invention. It is assumed that for each pair of gears in the drive the speed ratio is given by means of the number of teeth on every gear.

The terms pinion and gear will be applied to the gear wheel of a pair having the smaller and the greater number of teeth respectively.

There are three drawings, Figs. 1, 2 and 3, as follows:

Fig. 1 is a drawing of a typical pair of gears in a drive to show pressure angle, addendum, and other elements pertaining to the relative arrangement of two gears.

Fig. 2 is a drawing of a typical drive of several gears in series, as for instance, when W drives Y, which in turn drives Z. For such a case the last named gear (Z) obviously could not be allowed to mesh with the first one (W) as implied by the pitch circles being tangent to each other at point P'. This drawing, however, is so made in order to show not only the conditions as previously stated, but also those arising if the drive were the other way, namely, from W to Z to Y. In the latter case tangency of pitch circles at P could not be allowed.

Fig. 3 is a drawing showing the application to a drive of three gears in the locomotive booster to which my invention is particularly applicable.

Referring to Fig. 1, assume for illustration that the pinion, with center at A has 12 teeth, while the gear, with center at B, has 20 teeth. The base circles of pinion and gear are assumed to have given radii AE and BF respectively, which are, of course, directly proportional to the numbers of teeth. The pitch circles have radii AP and BP, respectively, these circles being tangent to each other at the pitch point (P).

Line $t'\,t$ is the "line of action" or "line of pressure," making the angle $\phi$ with a perpendicular to the line of centers (AB). This angle is called the "pressure angle."

The radial distance from the pitch circle of any gear to its "addendum circle," which bounds the tips of the teeth, is called the "addendum."

The pinion is shown as having two possible addendum circles, with radii AF and AF″ respectively. These two addendum circles are drawn to make clear the conditions which my invention is intended to improve, namely, that on any gear, the lengthening of the addendum distance increases the mean specific sliding previously referred to. Also it is to be noted that if the pinion addendum radius were greater than A$t'$, the contact would occur at a point inside of the gear base circle causing "interference" between the tip of the pinion tooth and some portion of the inner flank of the gear upon which contact is not to be tolerated.

In Fig. 1 note an important distance to which I apply the novel name of the "basic depth" or "gap", namely, the distance on the line of centers by which the base circles of any pair of meshing gears are separated from tangency. (See distance EF in Fig. 1.) I shall also call attention to the part played by the product of this distance times the well known "diametral pitch". This product will be referred to by the letter $f$ while the letters d. p. will be used as an abbreviation for diametral pitch.

It can be proved that in present practice of gear drives with a fixed pressure angle, this factor $f$, or in other words, the product of gap times diametral pitch, will vary for every pair of meshing gears according to the sum of the teeth in the pair.

My unique method as embodied in this invention is to reverse the usual practice by fixing the gap distance and hence the amount of this product with the resulting effect that the pressure angle is the thing which must vary for every pair, according to the sum of the teeth in the pair.

This plan leads to a hitherto unknown formula for pressure angle for any pair whose tooth numbers are given as follows:

$$\text{Cosine of pressure angle} = 1 - \frac{2 \times \text{gap} \times \text{diametral pitch}}{\text{Sum of teeth in the pair}} \quad (1)$$

or, in symbols:—

$$\text{Cosine } \phi = 1 - \frac{2 \times f}{N_p + N_g} \quad (2)$$

where $\phi$ = pressure angle for any pair.

$N_p$ and $N_g$ = number of teeth on pinion and gear of the pair.

$f$ = gap × diametral pitch.

It is to be emphasized that this product is fixed at the outset at a suitable number. For practical cases, I make the gap such that the product obtained by multiplying it by d. p. is in the neighborhood of unity, but my invention is not dependent upon any particular value for this product or for the gap distance from which it is obtained.

I will now give a rigorous proof of two important points mentioned above. First, I will prove that with a fixed pressure angle the product of gap × d. p. varies as the sum of the teeth in the pairs.

Referring to Fig. 1, gap = EF = EP + PF (3).
But EP = AP − AE = AP − AT = AP − AP cos $\phi$
Similarly PF = BP − BP cos $\phi$ } (4).
Since AP is pitch radius of pinion, AP = $N_p$/2 d. p. (5).
Similarly BP is pitch radius of gear and = $N_g$/2 d. p. (6.)
Substitute in (3) the values from (4), (5), (6), and get gap =
(AP + BP) (1 − cos $\phi$) = ($N_p + N_g$) (1 − cos $\phi$)/2 d. p.

Whence gap × d. p. = $\frac{(N_p + N_g)(1 - \cos \phi)}{2}$ (7).

By inspection of this last equation it appears that with a fixed pressure angle, the value of the product gap × d. p. varies as ($N_p + N_g$), as was stated above.

Next I will prove that if the value of gap × d. p. is fixed, the pressure angle must vary with the sum of the teeth and give my unique formula as written in Eq. (2) above. This proof requires only transposing Eq. (7) as follows:

$$1 - \cos \phi = \frac{2 \times \text{gap} \times \text{d. p.}}{N_p + N_g} \text{ whence } \cos \phi = 1 - \frac{2 \times f}{N_p + N_g} \quad (2)$$

where $f$ = gap × d. p. By inspection of Eq. (2) it appears that with a fixed value for gap × d. p., the angle $\phi$ must vary with the sum of the teeth.

The formula stated either in Eq. (1) or (2) is the basis of my invention and is advantageous because it automatically gives a large pressure angle when the sum of the teeth is small, which feature avoids interference, ordinarily a troublesome matter with gears having few teeth.

My peculiar arrangement requires that every single gear with a given number of teeth shall have a plurality of pressure angles, one for each wheel with which it may ever mesh; also a plurality of pitch circles in the same way, depending upon the sum of the teeth in each case.

I adopt another unique principle that in each meshing pair of wheels in the drive, the radial addendum distances shall be inversely proportional to the number of teeth. This automatically gives to the smaller wheel a long addendum and vice versa. This principle can be expressed in symbols as follows:

$$\frac{\text{Addendum of pinion}}{\text{Addendum of gear}} = \frac{\text{number of teeth on gear}}{\text{number of teeth on pinion}} = N_g/N_p \quad (8)$$

For example in Fig. 1 the pinion with 12 teeth has long addendum (PF), while the gear with 20 teeth has shorter addendum (PE), according to the formula $$PF/PE = \frac{20}{12}.$$

Any values for PF and PE which fulfill equation (8) would be a part of my scheme.

In order to arrive at suitable addendum distances which shall accord with the principle above stated (inversely proportional to tooth numbers), I proceed in either of two ways:—first, by making the addendum circle of each gear tangent to the base circle of its mating gear. That is, in Fig. 1, I draw the addendum circles of pinion and gear by dotted lines passing through F and E respectively. The radii of addendum circles are then readily calculated. That this construction gives addendums which are inversely proportional to the numbers of teeth is readily proved from Fig. 1. In cases where this construction is employed I call the resulting addendum distances the basic addendums and the corresponding circles I call basic addendum circles.

Second, when longer range of action is desired, I add an arbitrary extension to the basic addendum of the pinion and compute the corresponding extension required on the basic addendum of the mating gear by use of the inverse proportion above stated.

For example, in Fig. 1, let FF″ be any desired radial extension of the pinion basic addendum; then let the corresponding radial extension of the gear basic addendum be called X.

Then by the principle of addendum inversely proportional to number of teeth, I find $$\frac{X}{FF''} = \frac{12}{20}$$

whence I compute value of X and draw the addendum circle with B as center, through point E″ at distance X below E. This circle is shown dotted in Fig. 1.

In any case, then, both the basic addendums and the extended ones conform to the principle expressed in equation (8) above, namely, inversely proportional to the numbers of teeth.

The above principle is a particular method of securing a lower value for the mean specific sliding over the whole tooth profile than could be the case with equal addendum on pinion and gear.

For example, in Fig. 1, as the addendum of the pinion is increased, the meshing contact occurs at points closer to the tangent point $t'$ and increases the specific sliding. Yet it can be shown theoretically that this increase would be more than compensated by a decrease of specific sliding due to an equal reduction of addendum on the gear. That is, sliding action is worse near the base circle of the pinion, or smaller gear, of a pair.

By making the addendums inversely proportional to the numbers of teeth, I ensure that more of the action is taking place on the side of the pitch point toward the base circle of the gear, than on the other side, and that the mean specific sliding over the whole tooth profile is lower than it would be with equal addendums.

While pairs of gears with unequal addendums have been built, my arrangement, herein described, is novel, so far as I know in setting up this particular method of arriving at a regular system of apportioning unequal addendums so as to improve the mean specific sliding, and in carrying out this principle consistently through the whole drive.

NUMERICAL EXAMPLE.

In order to show how my invention is carried out in a drive consisting of several meshing pairs, I will give a numerical example. Referring to Fig. 2, let W, Y, and Z be three gear wheels their numbers of teeth being 12, 15 and 60 respectively. These gears are supposed to be arranged so that W drives Y, which in turn drives Z. In the drawing, however, the gear Z is brought around so as to indicate possible contact with W in order to bring out certain features which are referred to later.

Suppose the pinion W is desired to have diametral pitch (d. p.) of 2.0:

Then its pitch radius = $R_{pw} - 12/2 \times 2 = 3''.0$

*(1) Determine the preferable pressure angle for each pair.*

Let $\phi$ = pressure angle between W and Y. Adopting $\frac{1}{2}''$ as an arbitrary value for the basic depth or gap between base circles of W and Y, I get the product $$f = \text{gap} \times \text{d. p.} = 1/2'' \times 2 = 1.0$$

$$\cos \phi = 1 - \frac{2 \times 1}{12 + 15} = 0.9259; \text{ whence } \phi = 22.2 \text{ degrees.}$$

Again let $\phi''$ = pressure angle between gears Y and Z. In this case $N_p$ becomes 15 and $N_g = 60$ for use in formula (2).

The value of $f = \text{gap} \times \text{d. p.}$ does not have

Now substitute in the formula (2) for pressure angle this value of $f = 1.0$ and also $N_p = 12$ and $N_g = 15$. The formula then becomes to be the same as before but will be so taken for simplicity. Hence substitute $f = 1.0$ and get $$\cos \phi'' = 1 - \frac{2 \times 1.0}{15 + 60} = 0.9733; \text{ whence } \phi = 13.28 \text{ degrees.}$$

*(2) Determine the base circle radii for the whole drive.*

For the first gear (W) we have the given pitch radius. $R_{pw} = 3.''0$. Let $R_{bw}$ = radius of base circle of gear W. By the well known principle we have radius of base circle = Rad. of pitch circle × cosine of pressure angle; or $$R_{bw} = 3.''0 \times \text{cosine } 22.2 \text{ deg.} = 3'' \times .9259 = 2''.777$$

Now let $R_{by}$ and $R_{bz}$ = radii of base circles of gears Y and Z. All radii of base circles are in proportion to the tooth numbers by the well known principle:

$$R_{bw}:R_{by}:R_{bz} = 12:15:60 \text{ or } 2.777:R_{by}:R_{bz} = 12:15:60$$

Solving this I find that $$R_{by} = \frac{15}{12} \times 2.777 = 3''.47 \text{ and } R_{bz} = \frac{60}{12} \times 2''.777 = 13.''890.$$

*(3) Determine the pitch circles for the whole drive.*

Let $R_{py}$ = Rad. of pitch circle of Y when meshing with W.
$R''_{py}$ = Rad. of pitch circle of Y when meshing with Z.
$R''_{pz}$ = Rad. of pitch circle of Z when meshing with Y.

Again using the well known relation between radii of pitch and base circles, I compute:

$$R_{py} = R_{by}/\cos \phi = 3.472/0.9259 = 3.''75$$
$$\text{and } R''_{py} = R_{by}/\cos \phi'' = 3.472/0.9733 = 3.''565$$
$$\text{and } R''_{pz} = R_{bz}/\cos \phi'' = 13.890/0.9733 = 14.''260.$$

Attention is here drawn to the important fact that the gear Y has two pitch circles of radii, $R_{py}$ and $R''_{py}$ as above computed. The former is effective where Y meshes with W; the latter where it meshes with Z.

*(4) Determine center distances.*

The distance between centers of rotation of W and Y would be AB which is the sum of the pitch radii. Thus:

$$AB = R_{pw} + R_{py} = 3.''0 + 3.''75 = 6''.75.$$

Again the center distance for gears Y and Z would be BC (point C is beyond the limits of the drawing).

$$BC = R''_{py} + R''_{pz} = 3.''565 + 14.''260 = 17.''825.$$

Now note that if gear Z should ever be made to mesh with gear W, the formula herein described would give a still different pressure angle from those computed above and also different pitch circles.

The pressure angle would be $\phi' = 13.55°$, and the pitch radii would be $R'_{pw} = 2''.85$ and $R'_{pz} = 14''.277$. Then the center distance AC would become $$2''.85 + 14''.277 = 17''.127.$$

(5) *Determine addendums.*

For gear W draw basic addendum circle with A as center tangent to base circle of gear Y at point F and for gear Y draw basic addendum circle with B as center tangent to base circle of gear W at E. If the basic addendums PF and PE thus arrived at are not long enough to insure sufficient range of gear action, add on to each gear an extension as at S and Q, such radial extensions being inversely proportional to the numbers of teeth. That is, in this case:

$$\frac{\text{Radial extension at S}}{\text{Radial extension at Q}} = \frac{15}{12}$$

By the geometrical construction and these extensions (if used), we have addendums invariably proportional to the tooth numbers.

The addendum circles to be used where Y meshes with Z would be those indicated by dotted lines near point P'' in Fig. 2, or others found by extensions as previously stated which are inversely proportional to tooth numbers. The addendums for Y and Z would be measured from the pitch circles whose radii are respectively $R''_{py}$ and $R''_{pz}$.

ILLUSTRATION OF SPECIAL APPLICATION.

Gear drives constructed in accordance with this system are particularly advantageous where great power has to be transmitted with large gear ratio in a limited space, and with heavy tooth pressures.

Such an application is the one already made to the gear drive of what is known as "boosters" for locomotives, such as are shown in the patent to Ingersoll, No. 1,339,395, and that to Brown, No. 1,380,348, where they enabled a considerably greater speed reduction in a given space as compared with the use of a drive composed of standard gears with fixed pressure angles and usual addendums.

Referring to Fig. 3, the diagram shows the application to a booster having three gears A, B and C with 14, 19, and 41 teeth respectively.

Gear "A" is the driving crank shaft gear, "B" is the "idler", and "C" is the "axle gear" attached to the driver axle.

The two pressure angles $\phi$ and $\phi'$ are obtained by use of formula (2) and give to the idler gear (B) two different pitch circles ($R_{pb} = 4''.42$ and $R'_{pb} = 4''.331$). The first pressure angle and pitch circle are in use where the idler is driven by gear A; the second, where the idler drives gear C.

The pitch radius of gear C is smaller than it would be in a drive based on the standard 20 degree gears which this drive was designed to replace. This reduction, together with further reduction of addendum on gear C, makes a saving of space which is a desirable feature in many applications of gear drives.

But the most significant fact as brought out by actual tests, is the lessening of heating of the idler gear B which is rubbed not only by the gear A but also by gear C, and is therefore under double duty as respects opportunities for friction loss. Records of temperature of the metal of the idler gear at end of the runs showed much lower temperature than after a similar test of standard gears.

In conclusion, I will briefly recapitulate the novel features of this invention in contrast with the previous practice.

Previous practice has been to make gear drives using standard gears with fixed pressure angles usually of 14½ or 20 degrees, and with fixed proportions for addendums or working depths. Such pressure angles and addendums could not have the best or even preferable values for all the speed ratios which might be required in any drive or combination of successive gears.

Corrections of such standard gears have been proposed in a random manner for particular cases, but my invention goes beyond previous practice by providing a novel arrangement for combining or grouping gears into a drive with the pressure angles and addendums so varied for every particular gear ratio as to save space, avoid interference in low numbered pinions, increase tooth strength and reduce the quantity known as "mean specific sliding", which is an index number denoting the degree to which sliding friction is present over the working portion of the tooth profile.

I emphasize the fact that my invention relates to unique choice of pressure angle and addendum for each meshing pair in the drive, rather than to a novel type of tooth form, or method of cutting. My purpose is to improve the working properties of the drive as a whole when the gear ratios from pair to pair are known.

The use of this system for the locomotive booster as hereinbefore described, is an application already made with success, but the scheme is not limited to that particular machine.

I claim:—

1. A drive combination of involute gears arranged so that each meshing pair shall have its own preferable pressure angle and corresponding pair of pitch circles dependent upon the numbers of teeth in the pair, such angle being adopted according to the formula:

$$\text{Cosine of pressure angle} = 1 - \frac{2 \times \text{gap} \times \text{diametral pitch}}{\text{Sum of teeth in the pair}}$$

2. A drive combination of involute gears with addendum distances of each meshing pair made inversely proportional to the number of teeth in that pair.

In testimony whereof, I have hereunto signed my name.

ARTHUR E. NORTON.